(12) United States Patent
Bonas (10) Patent No.: US 11,489,943 B2
(45) Date of Patent: Nov. 1, 2022

(54) AUTOMATIC VERSION ROUTING AMONG MULTIPLE INSTANCES OF AN APPLICATION

(71) Applicant: Red Hat, Inc., Raleigh, NC (US)

(72) Inventor: Alissa Bonas, Kiryat Bialik (IL)

(73) Assignee: RED HAT, INC., Raleigh, NC (US)

(*) Notice: Subject to any disclaimer, the term of this patent is extended or adjusted under 35 U.S.C. 154(b) by 28 days.

(21) Appl. No.: 16/274,433

(22) Filed: Feb. 13, 2019

(65) Prior Publication Data

US 2020/0259928 A1    Aug. 13, 2020

(51) Int. Cl.
*H04L 29/08* (2006.01)
*H04L 67/63* (2022.01)
*G06F 16/955* (2019.01)
*H04L 45/50* (2022.01)
*H04L 67/563* (2022.01)

(52) U.S. Cl.
CPC ............ *H04L 67/63* (2022.05); *G06F 16/955* (2019.01); *H04L 45/507* (2013.01); *H04L 67/563* (2022.05)

(58) Field of Classification Search
CPC . H04L 67/327; H04L 67/2814; H04L 45/507; G06F 16/955
See application file for complete search history.

(56) References Cited

U.S. PATENT DOCUMENTS

| 7,234,035 | B2* | 6/2007 | Jerding | H04N 21/4586 709/219 |
|---|---|---|---|---|
| 9,729,652 | B2 | 8/2017 | Shahpurwala et al. | |
| 10,019,255 | B1* | 7/2018 | Greenfield | G06F 8/65 |
| 10,630,808 | B1* | 4/2020 | Watt | H04L 67/63 |
| 10,732,962 | B1* | 8/2020 | Florescu | G06F 11/0706 |
| 2002/0133805 | A1* | 9/2002 | Pugh | G06F 9/547 717/163 |
| 2003/0093572 | A1* | 5/2003 | Laux | G06F 9/5055 709/250 |
| 2003/0187929 | A1* | 10/2003 | Pugh | G06F 21/10 718/107 |

(Continued)

OTHER PUBLICATIONS

Minkowski, P., "Microservices Traffic Management Using Istio on Kubernetes," DZone, Microservices Zone, May 20, 2018, https://dzone.com/articles/microservices-traffic-management-using-istio-on-ku.

(Continued)

*Primary Examiner* — Vivek Srivastava
*Assistant Examiner* — Wuji Chen
(74) *Attorney, Agent, or Firm* — Kilpatrick Townsend & Stockton LLP (57) ABSTRACT

A processing device can receive a request directed to an application such as a service and parse the request to determine a version identifier based on the content of the request. The processing device can acquire a version label corresponding to at least one instance of the application from among multiple instances of the application and match the version label and the version identifier, providing automatic detection and routing of a request to an instance of an application with the correct version. The computing device can store version labels and routing rules for each instance among the multiple instances of the application deployed in the network prior to receiving requests, or determine version labels and routing when a request is received.

20 Claims, 5 Drawing Sheets

(56) References Cited

U.S. PATENT DOCUMENTS

| | | | |
|---|---|---|---|
| 2006/0009996 A1* | 1/2006 | Lipscomb | G06Q 30/0601 705/26.1 |
| 2008/0091837 A1* | 4/2008 | Langen | H04L 67/1014 709/230 |
| 2012/0005256 A1* | 1/2012 | Cherukuri | G06F 8/76 709/203 |
| 2012/0297365 A1* | 11/2012 | Altin | G06F 9/4493 717/124 |
| 2014/0067780 A1* | 3/2014 | Lipscomb | G06F 16/219 707/695 |
| 2015/0074055 A1* | 3/2015 | Jacoby | G06F 11/0778 707/639 |
| 2015/0128121 A1* | 5/2015 | Garcia | G06F 8/65 717/170 |
| 2015/0350344 A1* | 12/2015 | Sugimura | H04L 67/10 709/202 |
| 2016/0162275 A1* | 6/2016 | Morley | H04L 67/02 717/170 |
| 2016/0239274 A1* | 8/2016 | Strachota | G06F 8/30 |
| 2017/0060562 A1* | 3/2017 | Lopez | G06F 8/60 |
| 2017/0322934 A1* | 11/2017 | Chen | G06F 9/50 |
| 2017/0366586 A1* | 12/2017 | Bloesch | G06F 8/60 |
| 2018/0270122 A1* | 9/2018 | Brown | H04L 67/30 |
| 2020/0241865 A1* | 7/2020 | Phong | H04L 67/02 |
| 2020/0358846 A1* | 11/2020 | Bonas | H04L 67/51 |

OTHER PUBLICATIONS

"Advanced Deployment Strategies," Red Hat, Inc., 2018, https://docs.openshift.com/container-platform/3_11/dev_guide/deployments/advanced_deployment_strategies.html.

"Configuring Request Routing," Istio Authors, Jul. 9, 2018, https://istio.io/docs/tasks/traffic-management/request-routing/.

* cited by examiner

AUTOMATIC VERSION ROUTING AMONG MULTIPLE INSTANCES OF AN APPLICATION

TECHNICAL FIELD

The present disclosure relates generally to routing of requests to an application such as one providing a service in a cloud network. More specifically, but not by way of limitation, this disclosure relates to automatically routing a request to a version of an application or service when there are multiple, accessible, running versions of the application in the network.

BACKGROUND

A cloud computing system such as one based on a container orchestration framework includes clusters to which various applications are deployed. Requests are routed to the applications. A request, as an example, might be a uniform resource locator (URL) that calls an application programming interface (API) at which the application or a service is typically accessed. At times, multiple instances of an application may be deployed and running at the same time, wherein at least some of the instances are different versions of the application. The differences between versions of an application may extend to many parts of the application or may merely reflect different versions of an API or service that is provided by the application. Differing versions of the application may be running for testing purposes, for example, if the enterprise making use of the application is performing A/B testing of an older version and a newer version. Differing versions may also be running because it takes time to fully deploy a new version. While instances with differing versions are deployed, network resources can be temporarily configured by administrators to route requests to an instance of newer or older version as appropriate.

DETAILED DESCRIPTION

A cloud computing system such as one based on Kubernetes or OpenShift includes clusters to which various applications are deployed. Requests are routed to the applications, for example, requests to make use of a service provided by the application or to obtain or display information generated by the application. Multiple versions of an application are sometimes deployed and instances with different versions may be running at the same time. When differing versions are deployed, network resources can be temporarily configured to route requests to an instance of the correct version. But this configuration process is time consuming and error prone, since it is typically performed manually. And if this configuration is not done (or includes errors), requests to an application with multiple instances having differing versions may fail.

Some examples of the present disclosure overcome one or more of the issues mentioned above by providing automatic detection and routing of a request to an instance of an application with the correct version. In some examples, the request is parsed to determine a version identifier therein, and this version identifier is matched with a corresponding version label associated with an instance of the application. In some examples, the request calls the application generally. In other examples, the request calls a specific API or service that is provided by application.

As an example, a processing device in a system can receive a request directed to an application and parse the request to determine a version identifier, such as one identifying an API version, based on the content of the request. The processing device can acquire a version label, which may also be referred to as a tag, configuration, or metadata, corresponding to at least one instance of the application from among multiple instances of the application and match the version label and the version identifier. The processing device can then route the request based on the matching.

In some examples, a request includes a call to an API for a service provided by the application. A service can include a service distributed within a service mesh. The request can include a URL with the version identifier.

In some examples, the processing device acquires and stores version labels for each of the multiple instances of the application deployed in the network prior to receiving requests, and then determines and stores routing rules for each of the multiple instances. In other examples the processing device acquires version labels when a request is received (e.g., "on-the-fly") in order to match an appropriate version label with a version identifier in the request.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
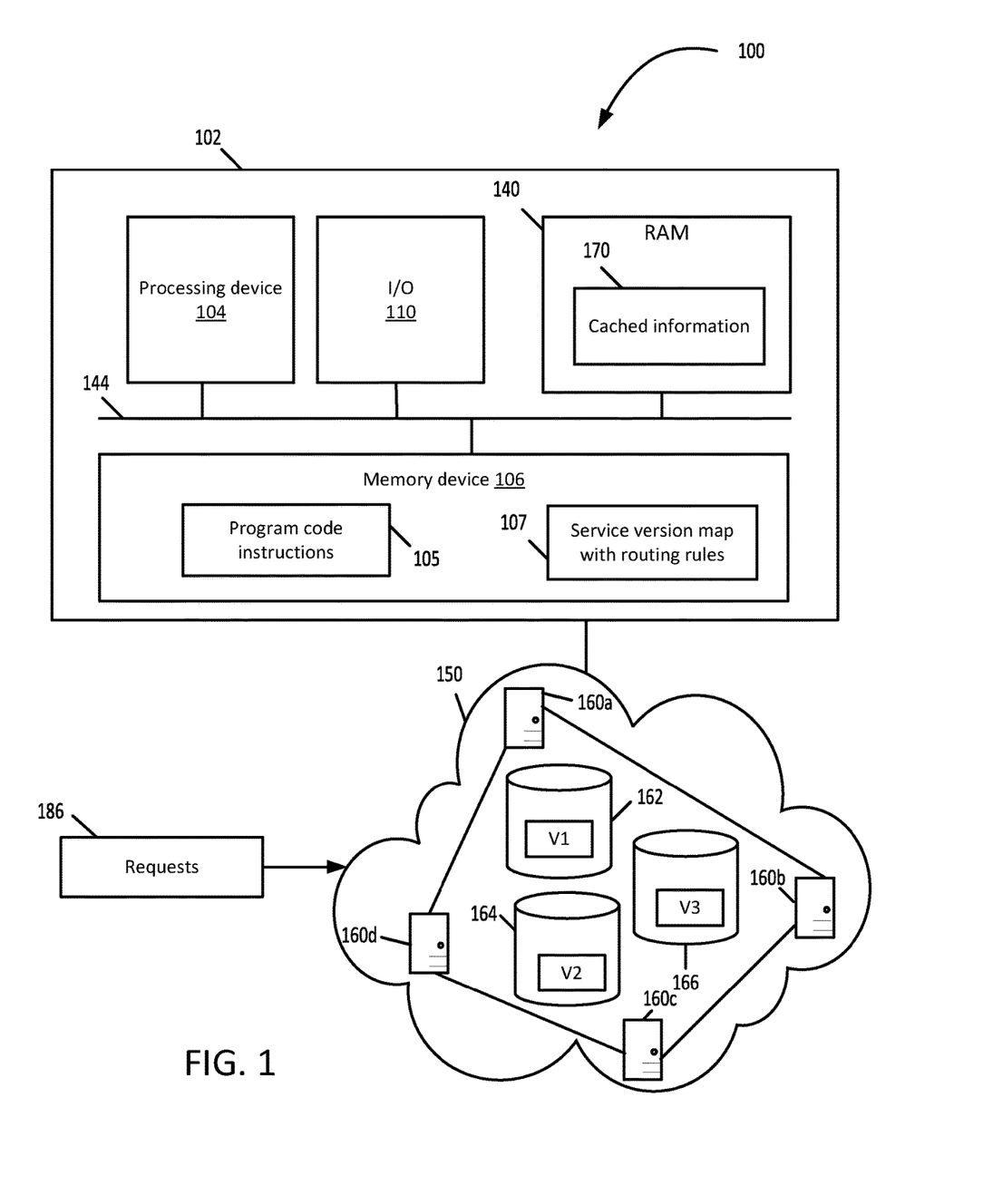
FIG. 1 is a block diagram of a system that provides automatic version routing according to some aspects of the disclosure.

FIG. 1 is a system 100 that provides automatic version routing according to some aspects of the disclosure. More specifically, the system 100 includes a computing device 102. Examples of the computing device 102 can include a server, laptop computer, desktop computer, or any combination of these. The computing device 102 can execute software as defined below, which causes computing device 102 to perform the tasks of automatic version routing according to some aspects of the disclosure. Software can include computer-readable instructions that are executable by a processing device 104, such as program code instructions 105. The system can be programmed in any suitable programming language. Just a few examples are Java, C++, C, and Python. Note that the software that implements automatic version routing as described in an exemplary fashion herein is distinct from the software that makes up applications running in the cloud network.

In FIG. 1, computing device 102 includes the processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with cloud network 150. Cloud network 150 connects computing device 102 to nodes 160a, 160b, 160c, and 160d, which in this example make up at least a portion of a hardware cluster. Each node can include a processing device, a memory device, I/O, and other components similar to computing device 102 and other typical computing devices. In the example of FIG. 1, nodes 160a-160d run containers 162, 164, and 166. A container operates as a substantially isolated environment in which to run an instance of an application. In this example, container 162 is running an instance of an application that is labeled version 1 (V1), container 164 is running an instance of an application that is labeled version 2 (V2), and container 166 is running an instance of an application that is labeled version 3 (V3). The application provides a service that is accessed through API calls received as service requests over the network 150.

A service is typically self-contained and aligns closely with a specific task. It is usually implemented with a single purpose in mind. Multiple services are the primary architectural building blocks of a service mesh that can be deployed in a cloud network. In some aspects, the version routing described herein is intended to account for differing API versions. An application or service version change may include a new version of an API as well. It is also possible for an underlying service to have different versions but for the API version to remain constant. Similarly, different API versions can be deployed while the version of the underlying service stays the same.

In the example of FIG. 1, cached information 170, such as, in this example, requests in the form of uniform resource locators (URLs), version identifiers, version labels, and other information used by system 100 may be stored in RAM 140. Requests 186 are received from device or systems, which can include user input devices or other computer systems that need services from within cloud network 150. In addition to computer program code instructions 105, which are executed by processing device 104 to perform matching and routing as described herein, memory device 106 can include a service version map 107. The service version map 107 is a stored reference that can be referred to by processing device 104 to determine which instances of an application providing a service map to which version labels. This stored service version map 107 may also include routing rules that are determined by the processing device when version labels are acquired. The routing rules are used to route requests to the appropriate version of an application or its service.

Services deployed on a network such as network 150 typically have labels (like tags) indicating various parameters. These labels can be implemented as textual metadata. A version label can used to indicate that different instances of the same service are deployed in parallel. In one example, when instances are examined, the service version 1 instance may be found to have a representational state transfer (REST) API that is accessed through the URL http://myservice/api/v1, and be tagged with label "version:v1." When a newer version of that service is deployed, the second version instance of that service may labeled with the label "version:v2" and its deployed code may contain an API that should be accessed at the URL http://myservice/api/v2. In order to route calls correctly to the relevant version, either http://myservice/api/v2 or http://myservice/api/v1, computer program code instructions 105 dynamically examine the service versions that are deployed and monitor the service requests to route the service request API calls, or automatically create or update the routing rules.

Figure 2:
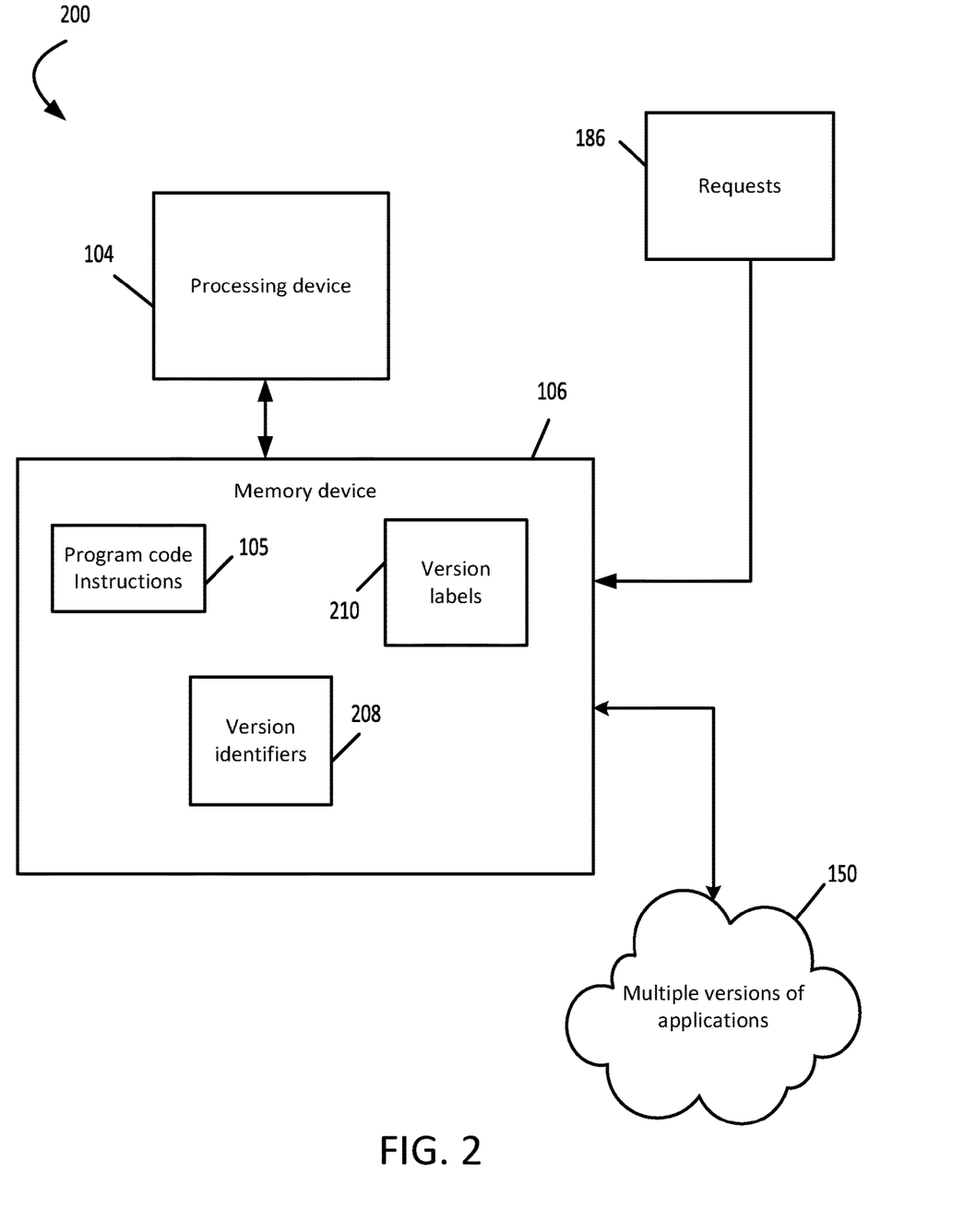
FIG. 2 is a block diagram of another system that provides automatic version routing according to some aspects of the disclosure.

FIG. 2 is a block diagram of an example of a system that provides automatic version routing according to some aspects of the disclosure. The system 200 includes the processing device 104 that can execute computer program code, also referred to as instructions or program code instructions 105, for performing operations related to providing automatic version routing. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc.

The processing device 104 can execute one or more operations for receiving a request directed to an application and parsing the request to determine a version identifier based on the content of the request. The processing device can acquire a version label corresponding to at least one instance of the application from among multiple instances of the application and match the version label and the version identifier. The processing device can then route the request based on the matching version label and version identifier.

To determine a version identifier from the request, the processing device in some examples may extract a version identifier from within the request, such as from part of a URL forming the request. Alternatively, the processing device may determine a version identifier by inference from other content in the request, by extracting a version identifier from the header of the request, or by examining the format of the request if only certain versions of an application support certain request formats. The source from which a request is received may also be indicative of an appropriate version of the application to handle the request.

Still referring to FIG. 2, memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 105. A computer-readable medium can include electronic, optical, magnetic, or other storage devices capable of providing the processing device with computer-readable instructions 105 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 106 can include stored version identifiers 208 that are based on the requests 186, and stored version labels 210 from instances of applications. Although FIGS. 1 and 2 depict a certain arrangement of components for illustrative purposes, other examples can include any number and combination of these components arranged in any suitable configuration.

Figure 3:
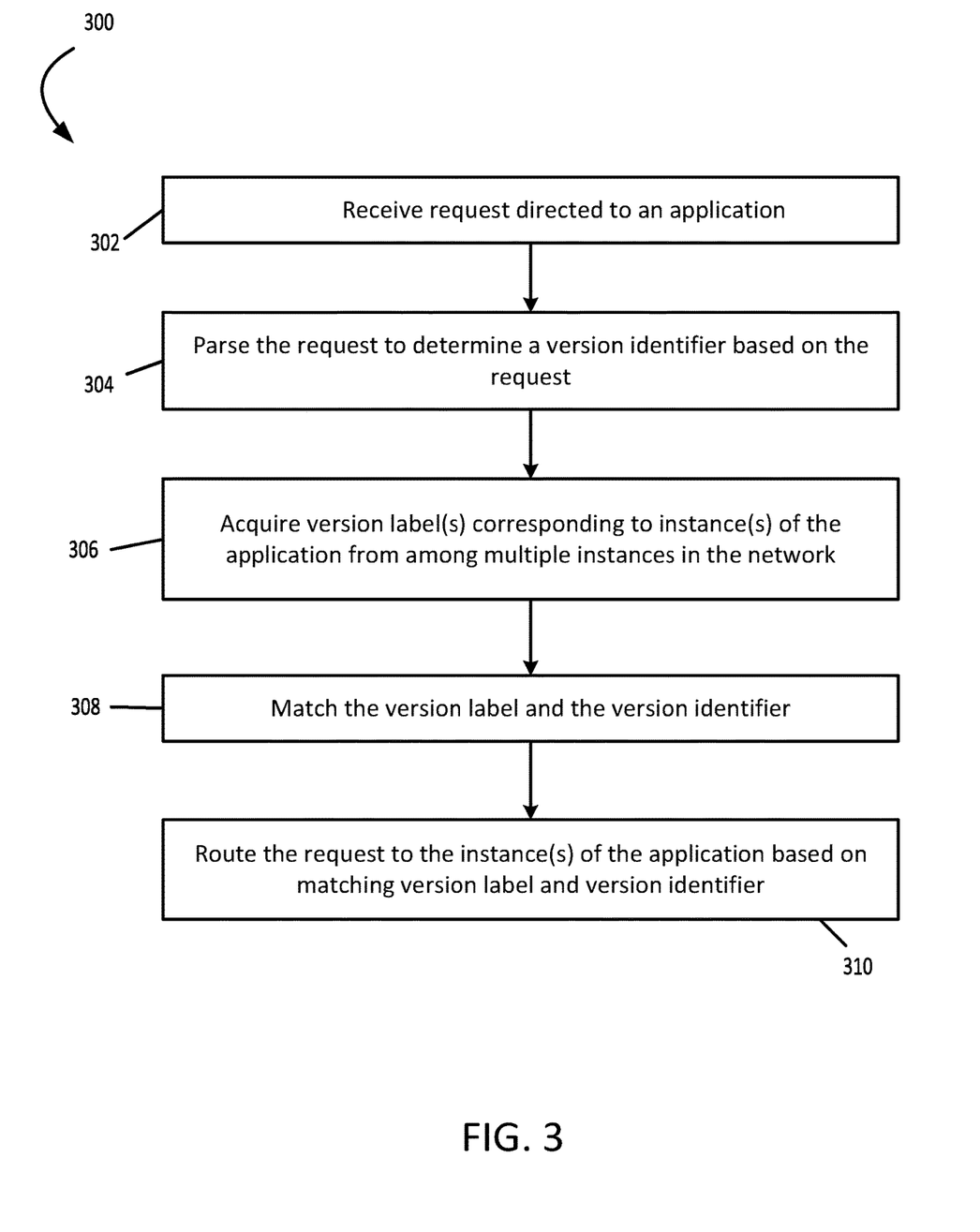
FIG. 3 is a flowchart of a process for providing automatic version routing according to some aspects of the disclosure.

In some examples, a processing device (e.g., processing device 104) can perform one or more of the operations shown in FIG. 3 to provide automatic version routing according to some aspects of the disclosure. In other examples, the computing device can implement more operations, fewer operations, different operations, or a different order of the operations depicted in FIG. 3. Process 300 of FIG. 3 is described below with reference to components discussed above.

At block 302, processing device 104 receives a request directed to an application. The request can, as an example, be a call to an API. At block 304, processing device 104 parses the request to determine a version identifier based on the content of the request. To determine a version identifier from the request, the processing device 104 may detect a version identifier that is part of the request, such as part of a URL. Alternatively, the processing device 104 may determine a version identifier by inference from other content in the request or from the format of the request. The processing device may determine a version identifier using other information, such as the origin of the request.

At block 306, the processing device 104 acquires one or more version labels 210 corresponding to one or more instances of the application in the network. The version label(s) 210 may be acquired from memory if the version label(s) 210 have been stored in advance, or may be acquired in real time from the instances of the application. For example, the processing device 104 can access a configuration file related to each instance of the application to determine the appropriate version label for each instance. As another example, the processing device 104 can communicate with each instance of the application to determine the appropriate version label for each instance. The processing device 104 can also query the API to determine the version.

At block 308, processing device 104 matches one of the version labels 210 to the version identifier. At block 310, processing device 104 routes the request to the appropriate instance of the application based on matching the instance's version label to version identifier.

Figure 4:
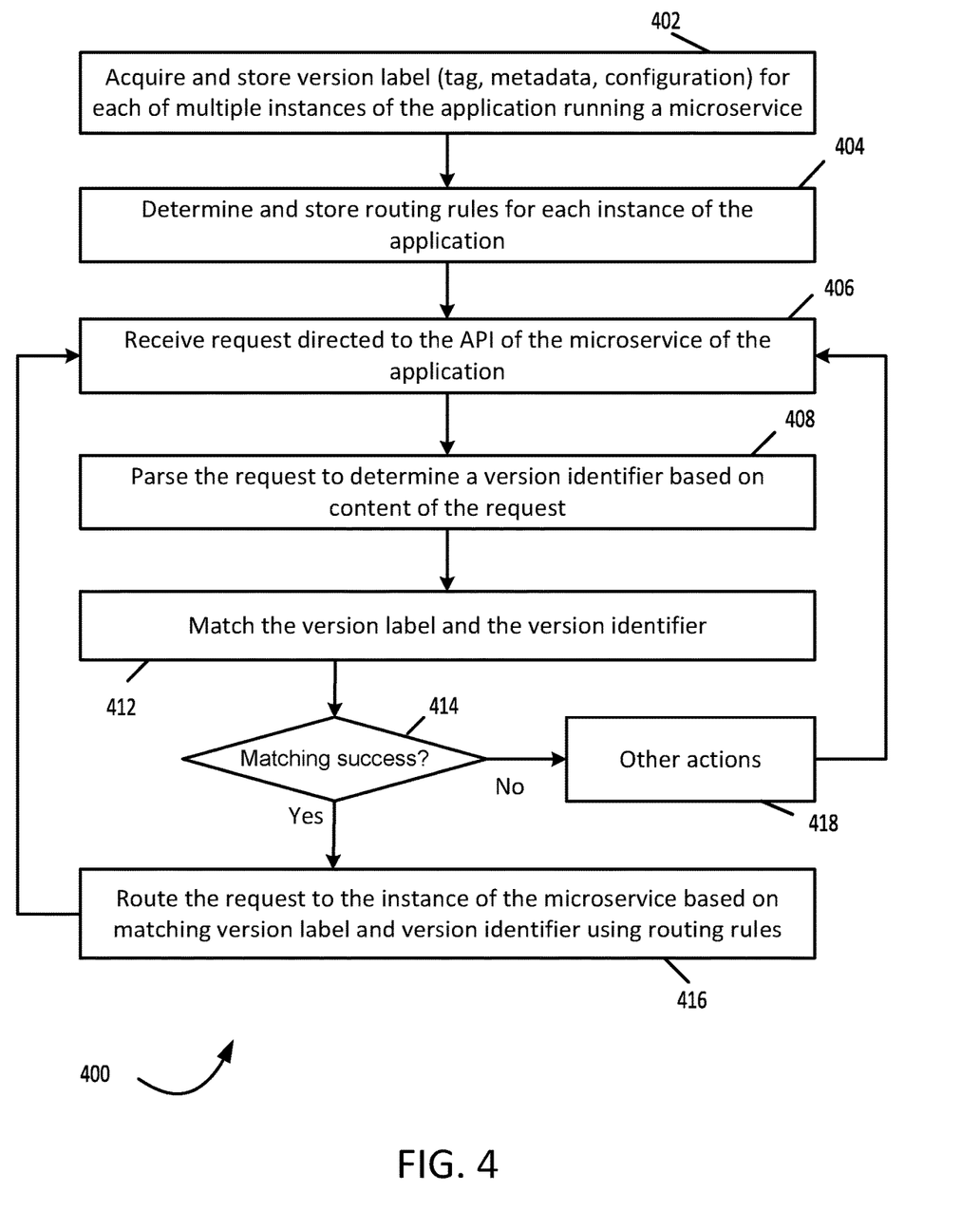
FIG. 4 is a flowchart of another process for automatic version routing according to some aspects of the disclosure.

As another example, a computing device such as processing device 104 can perform the operations of process 400 shown in FIG. 4 to provide automatic version routing according to some aspects of the disclosure. Process 400 of FIG. 4 is described below with reference to components discussed above.

At block 402, processing device 104 acquires and stores in memory device 106, a version label for each of multiple instances of an application. The application may be running a service capable of receiving requests over the network 150.

At block 404, processing device 104 determines and stores in memory device 106 routing rules for the service for each instance of the application. At block 406, processing device 104 receives a request directed to an API of the service of the application. There can be multiple instances of differing versions of the application running in the network 150.

At block 408, the processing device 104 parses the request to determine a version identifier based on the content of the request. The processing device 104 may detect that the version identifier is part of the request, may determine the version identifier by inference from other content in the request, may determine the version identifier from the format of the request, or may determine the version identifier in some other way.

At block 412, processing device 104 attempts to match a version label and the version identifier in order to find the correct version of the application for the request. If matching is successful at block 414, the process 400 proceeds to block 416, in which the processing device 104 routes the request to the correct instance of the application's service (e.g., based on the match between the version label and the version identifier), in accordance with the routing rules stored in memory device 106. If a match cannot be found, the API call of the request may fail, or some default or other action can be taken, as shown at block 418.

Figure 5:
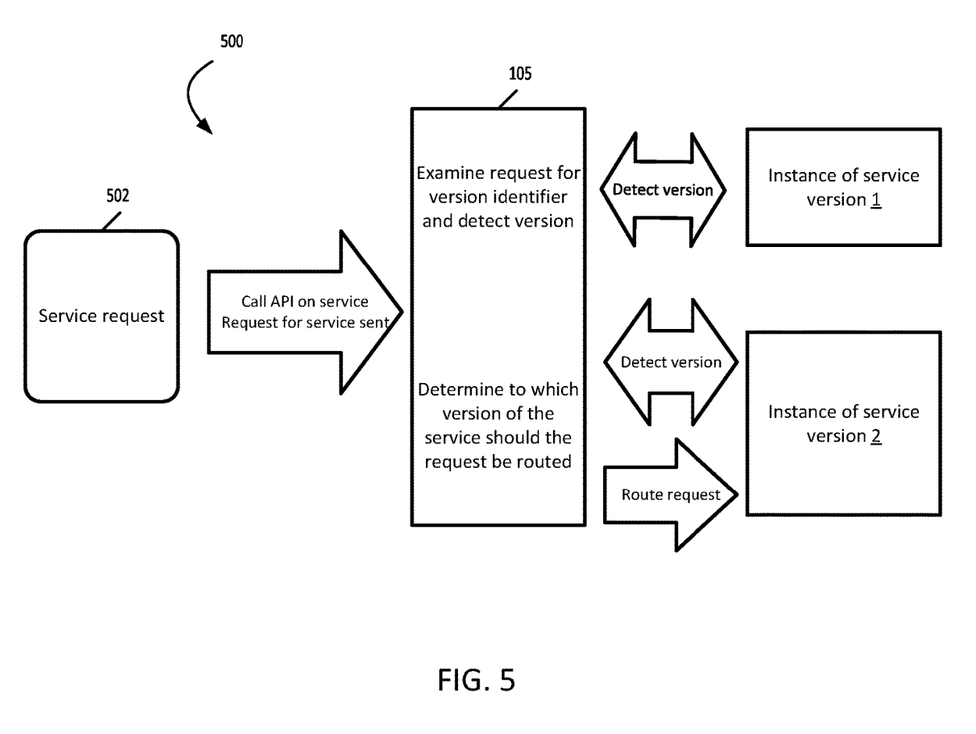
FIG. 5 is a data flow diagram showing the automatic version routing according to some aspects of the disclosure.

FIG. 5 is a data flow diagram showing an example of automatic version routing in according to some aspects of the disclosure. Data flow 500 includes two service instances, one for service version 1 and another for service version 2. These instances can be deployed using, for example, Kubernetes or OpenShift. Istio, the open source framework for service mesh, may be used to integrate services and manage traffic flow. The services may be provided by different versions of the application, and may be implemented as services in a service mesh in a cloud network. Data flow 500 includes a service request 502 to be processed by computer program code instructions 105.

A version label can used to indicate that different instances of the same service are deployed in the network. A version label can be a tag, configuration, or metadata. Assuming the service version 1 instance and the service version 2 instance of data flow 500 include such instances, the instances are examined. In one example, the service version 1 instance may be found to have a representational state transfer (REST) API that is accessed through the URL http://myservice/api/v1, and be found to be tagged in Kubernetes and istio with label "version:v1." When a newer version of that service is deployed, the second version instance of that service may labeled with the label "version: v2" and its deployed code may contain an API that should be accessed at the URL http://myservice/api/v2. In order to route calls correctly to http://myservice/api/v2 and http://myservice/api/v1, the deployed service versions and the service requests can be examined to correctly route each service request.

Referring again to FIG. 5, service request 502 is a URL sent by a requester that calls the API of the service. When service request 502 arrives, its URL is parsed and examined for a version identifier by computer program code instruction 105, and the version is detected based on the version identifier. If the version identifier exists in the URL, computer program code instructions 105 will match it to a version label corresponding to the relevant service targeted in the request. The version label may be detected at that time, or may have been detected in advance as previously described. "Matching" by the computer program code instructions is meant to refer to an attempt to match the identifier and a label, whether or not the attempt is successful. If the match is successful, the API call in the service request will be routed correctly. In the example of FIG. 5, the service request is routed to service version 2. If a match cannot be made, another action can be taken.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "less" or "more," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
querying an application programming interface (API) for each of a plurality of instances of an application to acquire service version labels from each of a newer and older service version of the application, each instance of the application deployed to a container in a cloud computing system using a container orchestration framework;
adding the service version labels to a stored service version map for the cloud computing system prior to routing a request directed to the application;
updating, using the service version labels, routing rules in the stored service version map prior to routing the request directed to the application;
receiving the request directed to the application;
parsing the request to infer a version identifier based on content of the request, the version identifier corresponding to a selected service version from among the newer and older service versions of the application;
determining, using the stored service version map for the cloud computing system, a service version label from the service version labels as updated and the routing rules as updated for at least one instance of the application;
determining that the service version label matches the version identifier; and
in response to determining that the service version label matches the version identifier, automatically routing, using the routing rules, the request to the at least one instance of the application running the selected service version corresponding to the version identifier.

2. The system of claim 1, wherein the request comprises a call to the application programming interface on a service provided by the application corresponding to the service version labels.

3. The system of claim 2, wherein the service comprises a service distributed within a service mesh.

4. The system of claim 1, wherein the request comprises a uniform resource locator.

5. The system of claim 1, wherein the operations further comprise determining the routing rules for each instance among the plurality of instances of the application.

6. The system of claim 1, wherein the operation of querying the application programming interface comprises acquiring the service version labels in real time after receiving the request.

7. A method comprising:
querying, by a processing device, an application programming interface (API) for each of a plurality of instances of an application to acquire service version labels from each of a newer and older service version of the application, each instance of the application deployed to a container in a cloud computing system using a container orchestration framework;
adding, by the processing device, the service version labels to a stored service version map for the cloud computing system prior to routing a request directed to the application;
updating, by the processing device, using the service version labels, routing rules in the stored service version map prior to routing the request directed to the application;
receiving, by the processing device, the request directed to the application;
parsing the request, by the processing device, to infer a version identifier based on content of the request, the version identifier corresponding to a selected service version from among the newer and older service versions of the application;
determining, by the processing device using the stored service version map for the cloud computing system, a service version label from the service version labels as updated and the routing rules as updated for at least one instance of the application;
matching, by the processing device, the service version label and the version identifier; and
automatically routing, by the processing device, using the routing rules, the request to the at least one instance of the application running the selected service version of the application corresponding to the version identifier based on the matching of the service version label and the version identifier.

8. The method of claim 7 wherein the request comprises a call to the application programming interface on a service provided by the application corresponding to the service version labels.

9. The method of claim 8 wherein the service comprises a service distributed within a service mesh.

10. The method of claim 7 wherein the request comprises a uniform resource locator.

11. The method of claim 7 further comprising determining the routing rules for each instance among the plurality of instances of the application.

12. The method of claim 7 wherein querying of the application programming interface comprises acquiring the service version labels in real time after receiving the request.

13. A non-transitory computer-readable medium comprising program code that is executable by a processing device for causing the processing device to:
query an application programming interface (API) for each of a plurality of instances of an application to acquire service version labels from each of a newer and older service version of the application, each instance of the application deployed to a container in a cloud computing system using a container orchestration framework;
add the service version labels to a stored service version map for the cloud computing system prior to routing a request directed to the application;
update, using the service version labels, routing rules in the stored service version map prior to routing the request directed to the application;
receive the request directed to the application;
parse the request to infer a version identifier based on content of the request, the version identifier corresponding to a selected service version from among the newer and older service versions of the application;
determine, using the stored service version map for the cloud computing system, a service version label from the service version labels as updated and the routing rules as updated for at least one instance of the application; and automatically route, using the routing rules, the request to the at least one instance of the application running the selected service version of the application corresponding to the version identifier based on matching the service version label and the version identifier.

14. The non-transitory computer-readable medium of claim 13 wherein the request comprises a call to the application programming interface on a service of the application corresponding to the service version labels.

15. The non-transitory computer-readable medium of claim 13 wherein the request comprises a uniform resource locator.

16. The non-transitory computer-readable medium of claim 13 wherein program code that is executable by the processing device to acquire the service version labels and the routing rules further causes the processing device to determine the routing rules for each of the plurality of instances of the application.

17. The non-transitory computer-readable medium of claim 13 wherein the program code that is executable for causing the processing device to query the application programming interface further causes the processing device to acquire the service version labels in real time after receiving the request.

18. The system of claim 1, wherein the service version labels comprise textual metadata describing an API version and an underlying service version of the application, and wherein the newer and older service versions correspond to at least one of newer and older API versions, or newer and older underlying service versions of the application.

19. The method of claim 7, wherein the service version labels comprise textual metadata describing an API version and an underlying service version of the application, and wherein the newer and older service versions correspond to at least one of newer and older API versions, or newer and older underlying service versions of the application.

20. The non-transitory computer-readable medium of claim 13, wherein the service version labels comprise textual metadata describing an API version and an underlying service version of the application, and wherein the newer and older service versions correspond to at least one of newer and older API versions, or newer and older underlying service versions of the application.

* * * * *